United States Patent
Andrade

(10) Patent No.: US 10,484,178 B2
(45) Date of Patent: Nov. 19, 2019

(54) SYSTEMS AND METHODS FOR PROVIDING A UNIVERSAL DECENTRALIZED SOLUTION FOR VERIFICATION OF USERS WITH CROSS-VERIFICATION FEATURES

(71) Applicant: Black Gold Coin, Inc., Las Vegas, NV (US)

(72) Inventor: Marcus Andrade, Las Vegas, NV (US)

(73) Assignee: Black Gold Coin, Inc., Las Vegas, NV (US)

( * ) Notice: Subject to any disclaimer, the term of this patent is extended or adjusted under 35 U.S.C. 154(b) by 0 days.

(21) Appl. No.: 15/961,603

(22) Filed: Apr. 24, 2018

(65) Prior Publication Data
US 2018/0248699 A1    Aug. 30, 2018

Related U.S. Application Data

(63) Continuation-in-part of application No. 15/335,344, filed on Oct. 26, 2016.

(51) Int. Cl.
*H04L 29/06* (2006.01)
*H04L 9/32* (2006.01)
(Continued)

(52) U.S. Cl.
CPC .......... *H04L 9/3231* (2013.01); *H04L 9/0643* (2013.01); *H04L 9/0897* (2013.01);
(Continued)

(58) Field of Classification Search
CPC ... H04L 9/3231; H04L 9/0643; H04L 9/0897; H04L 63/102; H04L 63/105; H04L 2209/38; H04L 9/3239; H04L 63/0861
See application file for complete search history.

(56) References Cited

U.S. PATENT DOCUMENTS

| | | |
|---|---|---|
| 5,291,560 A | 3/1994 | Daughman |
| 7,949,869 B2 | 5/2011 | Deshpande et al. |

(Continued)

FOREIGN PATENT DOCUMENTS

| | | |
|---|---|---|
| CN | 103927656 A | 7/2014 |
| WO | 20150183901 A9 | 3/2015 |
| WO | 2018007828 A2 | 1/2018 |

OTHER PUBLICATIONS

Bryans, D., "Bitcoin and Money Laundering: Mining for an Effective Solution," Indiana Law Journal, 2014, 33 pages, vol. 89, Issue 1, Article 13.

(Continued)

*Primary Examiner* — John B King
(74) *Attorney, Agent, or Firm* — Whitaker Chalk Swindle & Schwartz PLLC; Stephen Mosher

(57) ABSTRACT

System and methods for providing a universal decentralized solution for verification of users with cross-verification features, may be configured to receive from a first entity, at a trust utility such as a distributed database or blockchain, information related to one or more verified first document rents, the one or more verified first documents associated with a first user. The system may receive from a second entity, at the trust utility, a request for the information related to the one or more verified documents associated with the first user. The system may, upon receiving from the first user at the trust utility, an approval of the request for the information related to the one or more verified documents associated with the first user, give access to the second entity to obtain access to information related to the one or more verified documents associated with the first user.

11 Claims, 7 Drawing Sheets

(51) Int. Cl.
*H04L 9/06* (2006.01)
*H04L 9/08* (2006.01)

(52) U.S. Cl.
CPC .......... *H04L 63/105* (2013.01); *H04L 63/102* (2013.01); *H04L 2209/38* (2013.01)

(56) References Cited

U.S. PATENT DOCUMENTS

| | | | |
|---|---|---|---|
| 9,882,918 | B1 | 1/2018 | Ford et al. |
| 9,935,948 | B2 | 4/2018 | Schultz et al. |
| 9,992,022 | B1* | 6/2018 | Chapman ............ H04L 63/0861 |
| 2002/0147600 | A1 | 10/2002 | Waters et al. |
| 2002/0178354 | A1 | 11/2002 | Ogg et al. |
| 2005/0177750 | A1* | 8/2005 | Gasparini ............ G06F 21/31 726/5 |
| 2005/0182710 | A1* | 8/2005 | Andersson ......... G06Q 20/0425 705/39 |
| 2005/0246290 | A1 | 11/2005 | Kausik |
| 2007/0192853 | A1 | 8/2007 | Shraim et al. |
| 2009/0024853 | A1 | 1/2009 | Yeap et al. |
| 2009/0254440 | A1 | 10/2009 | Pharris |
| 2011/0137750 | A1 | 6/2011 | Gani |
| 2012/0084563 | A1 | 4/2012 | Singhal |
| 2013/0251214 | A1 | 9/2013 | Chung |
| 2013/0346309 | A1 | 12/2013 | Giori |
| 2015/0178693 | A1 | 6/2015 | Solis |
| 2015/0237048 | A1 | 8/2015 | Sun et al. |
| 2015/0324789 | A1* | 11/2015 | Dvorak ............... G06Q 20/3823 705/67 |
| 2015/0332283 | A1 | 11/2015 | Witchey |
| 2015/0348017 | A1 | 12/2015 | Allmen |
| 2015/0356523 | A1 | 12/2015 | Madden |
| 2015/0356555 | A1 | 12/2015 | Pennanen |
| 2016/0027229 | A1 | 1/2016 | Spanos et al. |
| 2016/0217452 | A1 | 7/2016 | Wong et al. |
| 2016/0283941 | A1 | 9/2016 | Andrade |
| 2016/0292672 | A1 | 10/2016 | Fay et al. |
| 2016/0292680 | A1 | 10/2016 | Wilson, Jr. et al. |
| 2016/0330027 | A1 | 11/2016 | Ebrahimi |
| 2017/0017936 | A1 | 1/2017 | Bisikalo et al. |
| 2017/0024579 | A1 | 1/2017 | Lacey |
| 2017/0048235 | A1* | 2/2017 | Lohe .................... G06Q 20/065 |
| 2017/0083907 | A1* | 3/2017 | McDonough ........ G06Q 20/14 |
| 2017/0085555 | A1* | 3/2017 | Bisikalo ............... H04L 9/3236 |
| 2017/0222814 | A1 | 8/2017 | Oberhauser et al. |
| 2017/0232300 | A1* | 8/2017 | Tran ..................... H04L 67/12 434/247 |
| 2017/0243209 | A1* | 8/2017 | Johnsrud ............. G06Q 20/40 |
| 2017/0279801 | A1 | 9/2017 | Andrade |
| 2017/0286717 | A1 | 10/2017 | Khi et al. |
| 2017/0300978 | A1 | 10/2017 | Narasimhan et al. |
| 2017/0316390 | A1 | 11/2017 | Smith et al. |
| 2017/0317997 | A1 | 11/2017 | Smith et al. |
| 2018/0013567 | A1* | 1/2018 | Davis .................... H04L 9/0637 |
| 2018/0028544 | A1 | 1/2018 | Isaacson et al. |
| 2018/0048461 | A1* | 2/2018 | Jutla ...................... G06F 21/33 |
| 2018/0075247 | A1 | 3/2018 | Campero et al. |
| 2018/0082256 | A1* | 3/2018 | Tummuru .......... G06Q 10/1053 |
| 2018/0117446 | A1* | 5/2018 | Tran ..................... A61B 5/0022 |
| 2018/0191503 | A1* | 7/2018 | Alwar .................. G06Q 20/065 |
| 2018/0268386 | A1* | 9/2018 | Wack .................. G06Q 20/102 |
| 2018/0285879 | A1* | 10/2018 | Gadnis ................. H04L 9/3231 |
| 2018/0302417 | A1* | 10/2018 | Wilson ................. H04L 9/3297 |
| 2019/0190724 | A1* | 6/2019 | Sundaresan ........... H04L 9/3271 |
| 2019/0205547 | A1* | 7/2019 | Horvath ................ G06F 21/36 |

OTHER PUBLICATIONS

European Patent Application No. EP15161502, Partial European Search Report, date of completion Oct. 6, 2015, 2 pages.
Extcoin, "Bitcoin Stack Exchange", <https://bitcoin.stackexchange.com/questions/13984/bitcoin-network-splits>, Oct. 22, 2013, p. 1.
Goldfeder et al. "Securing Bitcoin Wallets via Threshold Signatures", 2014, 11 pages.
Koshy, et al., "An Analysis of Anonymity in Bitcoin Using P2P Network Traffic," The Pennsylvania State University, 2014, 38 pages.
Meiklejohn et al., "A Fistful of Bitcoins: Characterizing Payments Among Men with No Names," University of California, San Diego, 2013, 13 pages.
Nakamoto, S., Bitcoin: A Peer-to-Peer Electronic Cash System; 9 pages; www.bitcoin.org.
PCT International Application No. PCT/IB2015/058805, International Search Report and Written Opinion dated Apr. 13, 2016, 15 pages.
PCT International Application No. PCT/US17/14938, International Search Report and Written Opinion, dated May 25, 2017, 10 pages.
PCT International Patent Application No. PCT/US18/029371, International Search Report dated Jul. 9, 2018, 2 pages.
PCT International Application No. PCT/US2016/024776, International Search Report, dated Jun. 16, 2016, 2 pages.
PCT International Application No. PCT/US2018/026136, International Search Report and Written Opinion, dated Jun. 15, 2018, 20 pages.
PCT International Application No. PCT/US18/029350, International Search Report dated Jul. 19, 2018, 2 pages.

\* cited by examiner

US 10,484,178 B2

SYSTEMS AND METHODS FOR PROVIDING A UNIVERSAL DECENTRALIZED SOLUTION FOR VERIFICATION OF USERS WITH CROSS-VERIFICATION FEATURES

CROSS-REFERENCE TO RELATED APPLICATIONS

This application is a continuation-in-part of U.S. patent application Ser. No. 15/335,344, filed Oct. 26, 2016, the entire content of which is hereby incorporated herein by reference in its entirety.

FIELD OF THE DISCLOSURE

This disclosure relates to systems and methods for providing verification of user identity information among business entities, and more particularly to providing a universal decentralized solution for verification of users with cross-verification features.

BACKGROUND

Currently, systems and methods for securing information related to an individual is or associated with documents of an individual are lacking in various ways. There is thus a need in the art for enhanced methods of securing such information related to individuals and their associated documents. For example, there is a need in the art for improvements to biometric security methods for securing information related to individuals and documents.

SUMMARY

Some implementations according to the present technology are directed to software methods that improve computer functionality by incorporating more robust security mechanisms into the system. For example, it is desirable to store information associated with an individual (user) in a secure fashion, including but not limited to such customary and accepted forms of personal identification associated with one or more users such as an identification card, passport, or other documents; other user data belonging to the user; or other information associated with the user. In some implementations, it may be desirable for the user to have the capability to allow or deny an entity (e.g., a business, institution, etc.) the right to access that information. In some implementations, a user's biometric data and privacy will be well protected while sharing biometric data with the public and/or others through the medium of a trust utility such as a blockchain (e.g., distributed ledger technology), a centralized ledger, or other trust utility organization. The present disclosure, in addition to customary and accepted forms of personal identification, provides a system operative in real time and without human intervention, to verify user identification information among two or more entities that is related to the verified documents of a user. The invention includes enhanced methods of biometric security of via face, retina, iris, fingerprint, and applied encrypted images for generating a biometric authentication code. The authentication code thus generated may then be applied or tagged directly to any data format that is utilized within a distributed ledger, such as in a blockchain-based system. Moreover, identification data associated with individual users may be further enhanced by the use of geo-location and connection datasets.

For example, in one current problem that exists in the prior art, Firm A has products and clients Firm B wants to use and vice versa. However, to engage in a cross-sell transaction an exchange of some of their clients' data to the other in order to conduct that business. In this disclosure, such transaction may be facilitated by utilizing (1) a distributed ledger (e.g., each firm is able to perform a keyword lookup to identify the number of clients Firm A has under that criteria); and (2) biometric identification verification tied directly to clients (e.g., from AML, KYC, and/or other documentation), wherein each firm knows for certainty that those clients' documents and digital identity qualified via biometric authentication are v rabble. The terms AML (Anti-Money Laundering) and KYC (Know Your Customer) refer to accepted forms of identity information useful in such authentication of the digital identity of a user or client.

In some implementations, a method and associated dashboard are contemplated. There may be a corresponding approval process running in a mobile application that facilitates each firm exchanging basic and premium profiles of a count of clients in order to cross-sell, with the clients' approval. If there is more than one firm, this may be accomplished in a one-to-one fashion or a many-to-many cross-matching fashion.

One aspect of the disclosure may relate to a system configured for a universal decentralized solution for verification of users with cross-verification features. The system may include one or more physical (i.e., hardware) processors and/or other components. The one or more physical processors may be configured by machine-readable instructions to receive from a first entity, at a blockchain or trust utility, information related to one or more verified first documents, the verified first documents associated with a first user. The physical processors may be configured to receive from a second entity, at the blockchain or trust utility, a request for the information related to the verified documents associated with the first user. The physical processors may be configured to, upon receiving from the first user, at the blockchain or trust utility, an approval of the request for the information related to the verified documents associated with the first user, give access, by the blockchain or trust utility, to the second entity to obtain access to information related to the verified documents associated with the first user. The physical processors may be configured to, upon receiving from the first user, at the blockchain or trust utility, a denial of the request for the information related to the verified documents associated with the first user, deny access, by the blockchain or trust utility, to the second entity to obtain access to information related to the verified documents associated with the first user.

Another aspect of the disclosure may relate to a method for providing a universal decentralized solution for verification of users with cross-verification features, the method being performed by one more physical processors configured by machine-readable instructions. The method may include receiving from a first entity, at a blockchain or trust utility, information related to verified first documents, the verified first documents associated with a first user. The method may include receiving from the second entity, at the blockchain or trust utility, a request for the information related to the verified documents associated with the first user. The method may include, upon receiving from the first user, at the blockchain or trust utility, an approval of the request for the information related to the verified documents associated with the first user, giving access, by the blockchain or trust utility, to the second entity to obtain access to information related to the verified documents associated with the first user. The method may include, upon receiving from the first user, at the blockchain or trust utility, a denial of the request for the information related to the verified documents associated with the first user, denying access, by the blockchain or trust utility, to the second entity to obtain access to information related to the verified documents associated with the first user.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise. In addition, as used in the specification and the claims, the term "or" means "and/or" unless the context clearly dictates otherwise.

DETAILED DESCRIPTION

Figure 1:
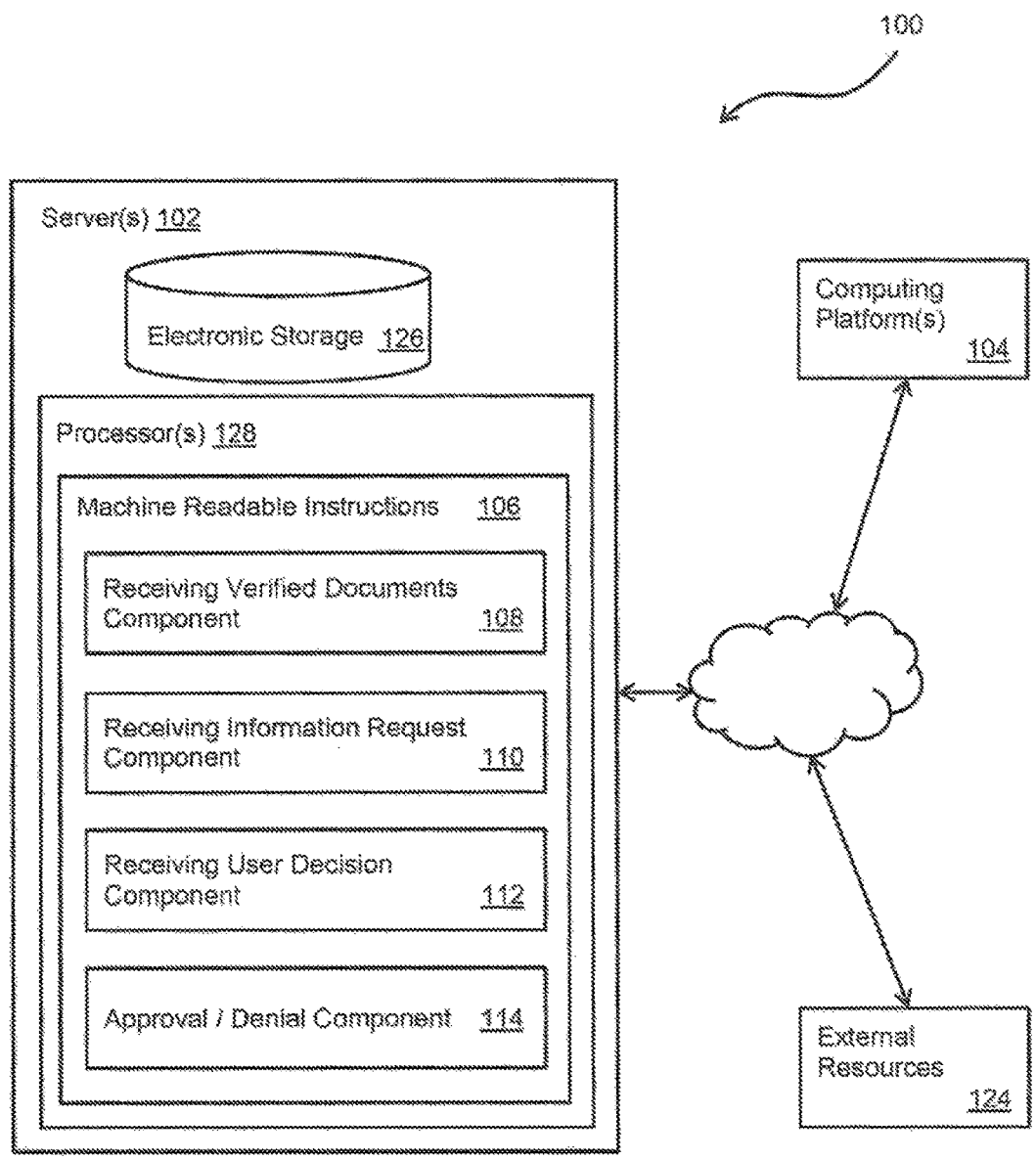
FIG. 1 illustrates a system for providing a universal decentralized solution for verification of users with cross-verification features, in accordance with one or more implementations.

The invention described herein is directed to systems and methods for the facilitation of transactions between entities by verification of user's identity information [according to FINRA rules, for example] in association with user documents among such entities as individuals, businesses, institutions, etc. and in particular such transactions that are performed through encrypted communications on line without needing a trusted third party. In addition to cross verifying user identification information, the system and the methods disclosed herein can also facilitate the transfer of a wide variety of digital assets.

The transactions are executed by agreements (such as so-called smart contracts) that are self-executing because certain specified conditions retired or execution are pre-authorized and agreed-to in advance, in the manner of an If—Then premise.

The pre-authorization requires the provision of the party's identities based on identity documents such as government-issued documents (driver's license, social security number, passport, etc.), biometric scan data (images, fingerprints, voice prints, etc.), user location data, accredited investor profiles, or other trusted references.

The identity documentation is evaluated in comparison with stored identity information through an algorithmic process to match the identity of a party to a transaction with stored identity data for that party held by an entity involved in the transaction to be executed.

The identity information held by an entity is that identity information submitted or obtained previously by the entity.

The identity information and the transaction ledger information are stored and immutable in a secure database such as a distributed or centralized ledger that provides a secure method for recording data. The distributed ledger functions as a trusted utility for facilitating and memorializing the details of the transaction.

AML and KYC documents are useful user identification resources because they contain or are associated with high quality, trust-worthy identification data. For example, AML documents associate user information such as passports, driver's licenses, perhaps social security numbers with transaction data known to be factually true. KYC documents include user information about financial transactions or assets useful in determining a user's status as an accredited investor. Examples include bank statements, insurance policies, mortgage loan documents, investment account information, etc. In one example AML and KYC documents may also be effectively used for user identification of assets digitally such as stocks and bonds.

One type of distributed ledger is a linear blockchain wherein data related to transaction documents and the digital signatures of the parties to the transaction are stored in blocks of data. The blocks of data are related through a process of sequentially hashing the blocks to form a chain. The chain of blocks is replicated on all nodes in a peer-to-peer network of participating entities. Non-linear distributed ledgers that employ directed acyclic graphs (DAG) include IOTA Tangle and Hedra Hashgraph. Such DAG-based systems have a topological ordering, such that a sequence has no directed cycles. Additionally, an Interplanetary File System (IPFS) can be implemented as part of the instant invention, such that peer-to-peer storage of data can be implemented.

The blockchain may be a public, decentralized or permissionless system or a private, centralized or permissioned system. Communication and access to both types may be secured by public/private keys.

Other types of distributed ledgers include Ethereum, Hyperledger Fabric, and R3 Corda, which differ primarily in the processes used to obtain consensus among the nodes as to the accuracy of the ledger.

Cross Verification refers to the secure exchange of requests and information between two or more entities as a precondition to a transaction—such as cross-selling—by verifying at one entity information sent to it from another entity. The information may be identity information or documents, or it may be of data about the documents associated with the identity information. An example of cross verify could be the comparison of identification information from various "trust" parties to determine which one is reliable.

FIG. 1 illustrates a system 100 for providing a universal decentralized solution for verification of users with cross-verification features, in accordance with one or more implementations. In some implementations, system 100 may include one or more servers 102. The server(s) 102 may be configured to communicate with one or more computing platforms 104 according to a client/server architecture, a peer-to-peer architecture, and/or other architectures. The users may access system 100 via computing platform(s) 104 such as desktop, laptop or tablet computers, and game consoles, wireless communication devices (e.g., smartphones), and other computing platforms capable of storing and executing program instructions.

The server(s) 102 may be configured to execute machine-readable instructions 106. The machine-readable instructions 106 may include one or more of a machine readable instruction components such as a receiving verified documents component 108, a receiving information request component 110, a receiving user decision component 112, an approval/denial component 114, and/or other machine-readable instruction components.

The machine-readable instructions 106 may be executable to establish verification addresses on a distributed ledger-or other trust utility. Generally speaking, a trust utility may be a transaction database shared by some or all nodes participating in system 100. In a trust utility the trust is built into the structure of the transaction database due to the security mechanisms incorporated within it. For example, once a transaction is deposited with the trust utility, that information becomes immutable—i.e., it cannot be altered. The participation of the nodes may be based on the Bitcoin protocol, Ethereum protocol, and/or other protocols related to digital currencies, and/or distributed ledgers (or other trust utilities). With respect to a blockchain, a full copy of the blockchain contains every transaction ever executed in an associated digital currency. In addition to transactions, other information may be contained by the blockchain or trust utility, such as described further herein.

The blockchain example of a trust utility may be based on several blocks. A block may include a record that contains and confirms one or more waiting transactions. Periodically (e.g., roughly every one minute), a new block including transactions and or other information may be appended to the blockchain. In some implementations, a given block in the blockchain contains a hash of the previous block. This may have the effect of creating a chain of blocks from a genesis block (i.e., the first block in the blockchain) to a current block. The given block may be guaranteed to come chronologically after a previous block because the previous block's hash would otherwise not be known. The given block may be computationally impractical to modify once it is included in the blockchain because every block after it would also have to be regenerated.

A given verification address may include a specific location on the blockchain, distributed ledger or trust utility where certain information is stored. In some implementations, an individual verification address within the blockchain or trust utility may be referred to as an "DUID Address." A DUID may be a "digital unique identifier" or a "digital unique identity" in the context of verified first documents as defined below.

The receiving verified documents component 108 may be configured to receive from a first entity, at a blockchain or trust utility, information related to one or more verified first documents. The verified first documents maybe those documents associated with a first user (individual). The first entity may include of an, institution, business, company, and/or other entities.

In some implementations, the blockchain or trust utility of the present technology may differ from a standard blockchain. It may differ in that although the present technology may utilize an Ethereum blockchain (or any other type of blockchain or trust utility not tied to any cryptocurrency), the Ethereum blockchain and/or Ethereum private blockchain may be created to be suited for various things. When Ethereum is used as a public blockchain a fee to execute the transaction is required before the transaction can proceed. This fee is called "gas." When Ethereum is used as a private blockchain the gas fee must be paid but can be generated by mining, which is a burdensome process. Some examples may include integrating components related to biometric tagging and/or biometric encryption of documentation held within the blockchain. The use of datasets, while ensuring client/individual data privacy and adhering to rules for the global data processing directive is envisioned.

The trust utility may be a closed loop trust utility private blockchain in some implementations. In some implementations, the closed loop trust utility private blockchain may be made country-specific. In some implementations, due to data protection and information communication office rules in different countries, the trust utility or distributed ledger may not be operated as a decentralized model. Instead, the trust utility may be operated as a closed-loop or centralized model. One reason some implementations may be county-specific is the scenario where a first country and/or business do not want confidential and/or secure information to be shared or accessed by a second country and/or business. The trust utility may be enabled to have separate implementations for country-specific practices. It should he noted that the distributed ledger or trust utility may be operated as either a centralized model or a decentralized model, in various implementations.

In some implementations, the information related to the verified documents associated with the first user may be encrypted with a first key and a second key. The first key may be a server key (e.g., a private key) that is stored on a backend server. The second key may be a client key that is a hash of biometric data associated with the first user (e.g., a hash generated by providing the biometric data as input to a one-way hashing algorithm). In some implementations, the first and second keys may be applied to the blockchain immutable ID for hyper-encryption of sensitive data formats and/or associated documentation.

Receiving information request component 110 may be configured to receive from a second entity, at the blockchain or trust utility, a request for the information related to the verified documents associated with the first user. The second entity may include one or more of an institution, business, company, and/or other entities.

Receiving user decision component 112 may be configured to receive a decision (to give access or deny access) from the first user regarding the request for the information related to the verified documents associated with the first user at the blockchain or trust utility.

In some implementations, approval/denial component 114 may be configured to give or deny access to the first entity. If the request for the information is approved by the first user, access may be given by the trust utility for the second entity to obtain access to the information. Likewise, if the request for the information is not approved by the first user, access may be denied by the trust utility for the second entity to obtain access to the information. In some implementations, the trust utility holds and applies biometric authentication code validation against information related to the verified documents associated with the first user. In some implementations, the first user may be notified if information related to the verified documents associated with the first user is accessed by authorities or others.

System 100 may be configured to associate identifiers with individuals having previously verified personal identities. For example, a first identifier may be associated with a first individual. The first individual may have a previously verified personal identity. Generally speaking, an identifier may include one or more of a number, an alphanumeric code, a username, and/or other information that can be linked to an individual. In some implementations, an individual identifier may be referred to as DUID or digital unique ID.

In accordance with some implementations, an individual having a previously verified personal identity may have obtained the previously verified personal identity through a variety of approaches and the individual may be required to provide evidence of the individual's identity. Such evidence (the information referred to above) may include one or more of providing a copy of a government issued identification (e.g., passport and/or driver's license), providing a copy of mail received by the individual (e.g., a utility bill), evidence provided by a third party, and/or other evidence on an individual's identity. The evidence may be provided to an entity associated with server(s) 102.

System 100 may be configured to assign verification addresses on a trust utility to the individuals. A given verification address may generated based on a public key and/or a private key. By way of example, a first verification address may be assigned to the first individual. The first verification address may be generated based on a first public key and/or a first private key.

Generally speaking, a public and private key-pair may be used for encryption and decryption according to one or more public key algorithms. By way of non-limiting example, a key pair may be used for digital signatures. Such a key pair may include a private key for signing and a public key for verification. The public key may be widely distributed, while the private key is kept secret (e.g., known only to its proprietor). The keys may be related mathematically, but calculating the private key from the public key is unfeasible.

In some implementations, system 100 may be configured such that private keys may be stored within computing platform(s) 104. For example, the first private key may be stored within a computing platform 104 and/or other locations associated with the first individual. In accordance with some implementations, a private key may be stored in one or more of a user's "verify.dat" file, a SIM card, and/or other locations.

In some implementations, system 100 may be configured such that multiple verification addresses may be assigned to separate individuals. For example, in addition to the first verification address, a second verification address may be assigned to the first individual. One or more additional verification addresses may be assigned to the first individual, in accordance with one or more implementations.

System 100 may be configured to record identifiers and biometric data associated with the individuals at corresponding verification addresses. For example, the first identifier and first biometric data associated with the first individual may be recorded at the first verification address. Recording information at a given verification address may include recording a hash or other encrypted representation of the information. In some implementations, different biometric data may be recorded at multiple verification addresses assigned to a single given individual. For example, in addition to the first identifier and the first biometric data associated with the first individual (first user) being recorded at the first verification address, the first identifier and second biometric data associated with the first individual may be recorded at a second verification address.

Generally speaking, biometric data may include metrics related to human characteristics. Biometric identifiers are distinctive, measurable characteristics that can be used to label and describe individuals, Biometric identifiers typically include physiological characteristics, but may also include behavioral characteristics and/or other characteristics. Physiological characteristics may be related to the shape of an individual's body. Examples of physiological characteristics used as biometric data may include one or more of fingerprint, palm veins, face recognition, DNA, palm print, hand geometry, iris recognition, retina, odor or scent, and/or other physiological characteristics. Behavioral characteristics may be related to a pattern of behavior of an individual. Examples of behavioral characteristics used as biometric data may include one or more of typing rhythm, gait, voice, and/or other behavioral characteristics. Online user behavioral characteristics may include a cyber behavior profile to identify a person's identity.

The biometric, data may include one or more of an image or other visual representation of a physiological characteristic, a recording of a behavioral characteristic, a template of a physiological characteristic and or behavioral characteristic, and/or other biometric data. A template may include a synthesis of relevant features extracted from the source. A template may include one or more of a vector describing features of a physiological characteristic and/or behavioral characteristic, a numerical representation of a physiological characteristic and/or behavioral characteristic, an image with particular properties, and/or other information.

Biometric data may be received via computing platforms 104 associated with the individuals. For example, biometric data associated with a first individual may be received via a first computing platform 104 associated with the first individual. The first computing platform 104 may include an input device (not depicted) configured to capture and/or record a physiological characteristic and/or behavioral characteristic of the first individual. Examples of such an input device may include one or more of a camera and/or other imaging device, a fingerprint scanner, a microphone, an accelerometer, and/or other input devices.

System 100 may be configured to provide an interface for presentation to individuals via associated computing platforms 104. The interface may include a graphical user interface presented via individual computing platforms 104. According to some implementations, the interface may be configured to allow a given individual to add or delete verification addresses assigned to the given individual so long as at least one verification address is assigned to the given individual.

In some implementations, system 100 may be configured to access and/or manage one or more user profiles and/or user information associated with users of system 100. The user profiles and/or user information may include information stored by server(s) 102, one or more of the computing platform(s) 104, and/or other storage locations. The user profiles may include, for example, information identifying users (e, g, a username or handle, a number, an identifier, and/or other identifying information, security login information (e.g., a login code or password), system account information, subscription information, digital currency account information (e.g., related to currency held in credit for a user), relationship information e.g., information related to relationships between users in system 100), system usage information, demographic information associated with users, interaction history among users in system 100, information stated by users, purchase information of users, browsing history of users, a computing platform identification associated with a user, a phone number associated with a user, and/or other information related to users.

The machine-readable instructions 106 may be executable to perform blockchain-based multifactor personal identity verification using the verification addresses, System 100 may be configured to receive one or more identifiers in connection with one or more requests to verify an identity of one or more individuals. For example, the first identifier may be received in connection with a request to verify an identity of the first individual. Requests for identity verification may be provided in connection with and/or related to financial transactions, information exchanges, and/or other interactions. Requests may be received from other individuals and/or other third parties.

System 100 may be configured to extract the biometric data associated with the one or more individuals from the corresponding verification addresses. For example, the first biometric data associated with the first individual may be extracted from the first verification address. Extracting Information(e.g., biometric data) from a verification address may include decrypting information.

According to some implementations, system 100 may be configured such that, responsive to receiving the request to verify the identity of the first individual, a prompt may be provided to the first individual for biometric data matching the first biometric data and a private key matching the first private key. The prompt may be conveyed via a computing platform 104 associated with the first individual. The prompt may be conveyed via a graphical user interface and/or other user interface provided by the computing platform 104 associated with the first individual. The prompt may include an indication that is one or more of visual, audible, haptic, and/or other indications, In some implementations, system 100 may be configured such that, responsive to receiving the request to verify the identity of the first individual, a prompt may be provided to a computing platform 104 associated with the first individual. The prompt may cause the computing platform 104 to automatically provide, to server(s) 102, biometric data matching the first biometric data and/or a private key matching the first private key.

System 100 may be configured to verify the identity of the individuals upon, or in response to, receiving matching biometric data and private keys. For example, the personal identity of the first individual may be verified upon receipt of (1) biometric data matching the first biometric data and (2) a private key matching the first private key. Verifying the personal identity of the first individual may include comparing stored information with newly received information.

According to some implementations, identity system 100 may be configured such that the personal identity of the first individual may be verified upon receipt of (1) biometric data matching the first biometric data or the second biometric data and (2) a private key matching the first private key. Such implementations may provide so-called "M-of-N" signatures for identity verification where some subset of a larger set of identifying information is required.

In some implementations, system 100 may be configured such that the biometric data matching the first biometric data and the private key matching the first private key may be used to sign the verification of the personal identity of the first individual.

In some implementations, at least one dedicated node performs the signing of the verification of the personal identity of the first individual or user. A given dedicated node may include one or more of server(s) 102. The given dedicated node may be a public node or a private node configured for creating new blocks and/or for signing verification.

Figure 2:
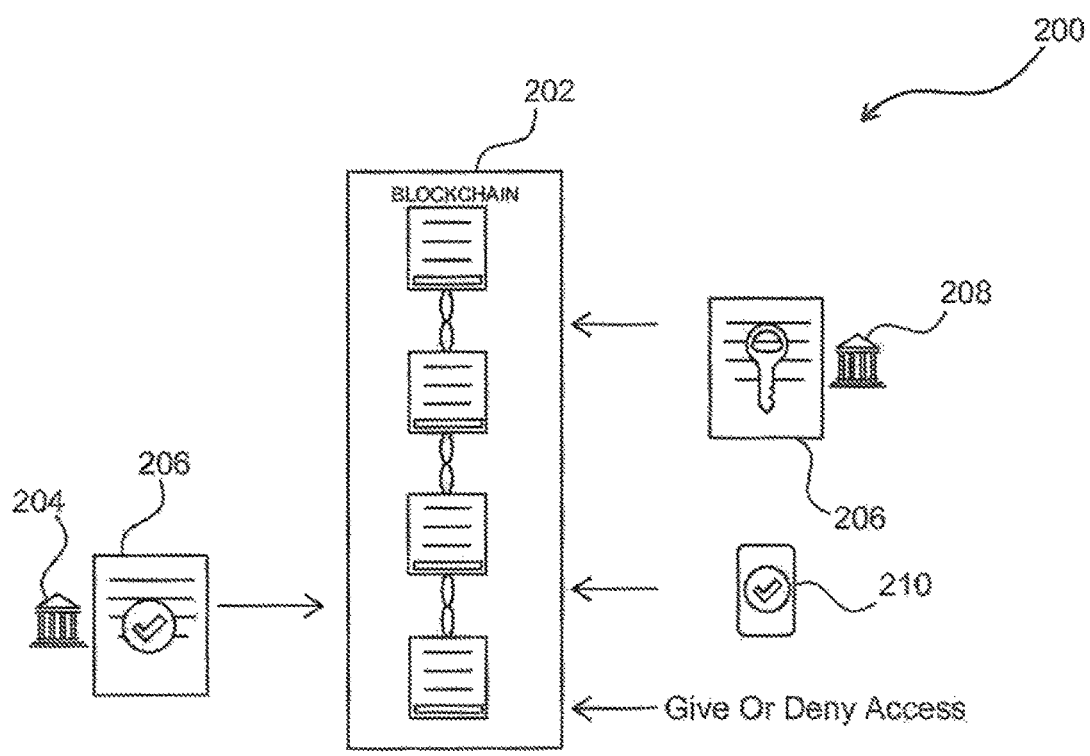
FIG. 2 is a schematic showing how entities may communicate with a blockchain or trust utility, in accordance with one or more implementations

FIG. 2 is a schematic 200 showing how entities may communicate with a blockchain or trust utility 202, in accordance with one or more implementations. Blockchain or trust utility 202 may receive from a first entity 204, information related to one or more verified first documents 206, the verified first documents 206 associated with a first user.

In some implementations, blockchain or trust utility 202 may receive from a second entity 208 a request for the information related to the verified documents 206 associated with the first user. One or more documents 206 may be encrypted using, for example, an entity key to provide unique access.

In some implementations, blockchain or trust utility 202 may receive a decision (approval or denial) from the first user, regarding the request for the information related to the verified documents associated with the first user.

In some implementations, system 100 may give (grant) or deny access to the first user. If the request for the information is approved by the first user, access may be given by blockchain or trust utility 202 for second entity 208 to obtain access to the information. Likewise, if the request for the information is not approved by the first user, access may be denied by blockchain or trust utility 202 for second entity 208 to obtain access to the information.

Figure 3:
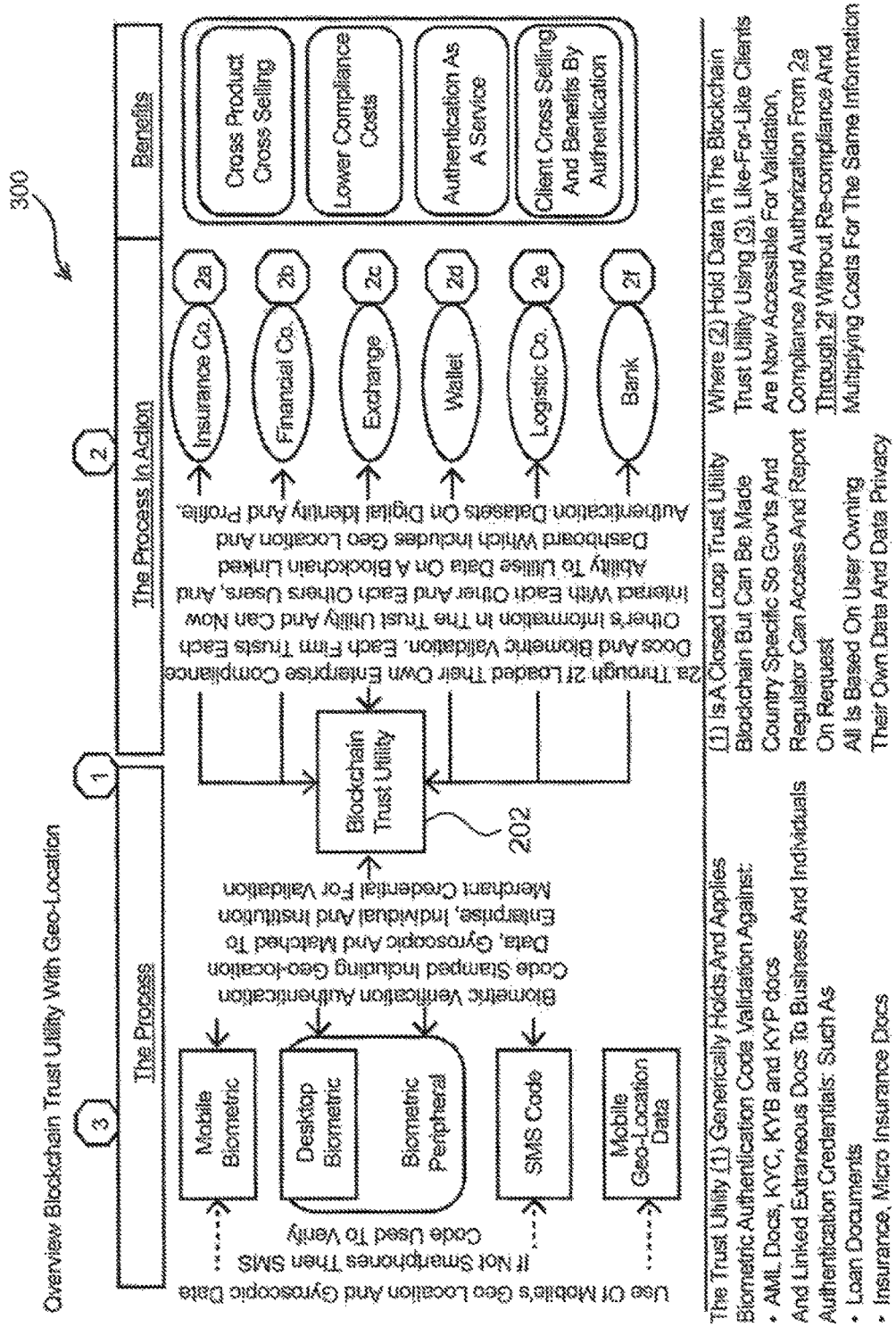
FIG. 3 illustrates an overview of a blockchain or trust utility with geo-location, in accordance with one or more implementations.

FIG. 3 illustrates an overview 300 of blockchain or trust utility 202 with geo-location, in accordance with one or more implementations. Location data may be any information about an individual's current location, or about their movements in the past, which can be linked to them. In some implementations, the types of data collected and applicable may include: base station data Received Signal Strength Indicator (RSSI), Time Difference of Arrival (TDOA), and Angie Of Arrival (AOA), GPS data, WiFi Access points (including, Medium Access Control (MAC) addresses via mobile or passive scanning); static geo-location, dynamic/ongoing geolocation, location-based services and/or service set IDs (SSIDs). The use of keyhole markup language (KML) files to create datasets is contemplated; however, the use of any location-based dataset that utilizes markup languages is contemplated.

In some embodiments, certain rules for geo-location may be followed. A legal framework may be the data protection directive (95/46/EC). It may apply in cases where personal data is being processed as a result of the processing of location data. The e-privacy directive (2002/58/EC, as revised by 2009/136/EC) applies to the processing of base station data by public electronic communication services and networks (telecom operators). In some implementations, blockchain or trust utility 202 generically holds and applies biometric code validation against one or more of anti-money laundering (AML) documents, know your customer (KYC) documents, know your business (KYB) documents (such as formation documents, bank statements, annual reports, transaction information, etc.), know your person/process (KYP) documents, extraneous documents linked to businesses and individuals, various authentication credentials, and/or other items.

Figure 4:
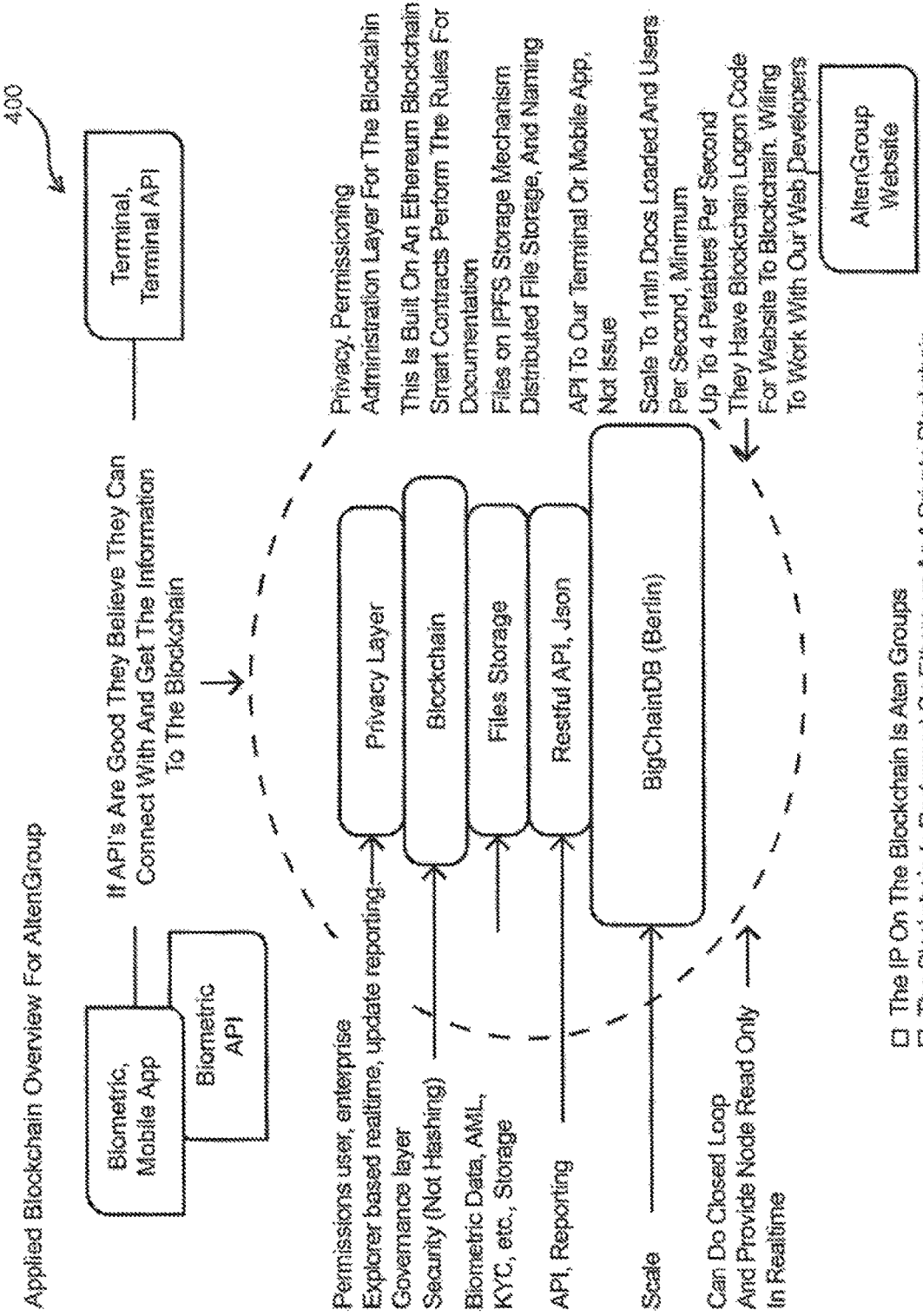
FIG. 4 illustrates an applied blockchain overview, in accordance with one or more implementations.

FIG. 4 illustrates an an example of a private, permissioned blockchain overview 400, in accordance with one or more implementations. As shown and described in the figure, a privacy permissioning administration layer for the blockchain is envisioned. It may be built on, for example, an Ethereum (public, permission less) blockchain. As shown, there may be a mechanism for the storage of files (e.g., biometric data, etc.). These items may be coupled with an application programming interface (API) and, inter alia, a BigChainDB. This may be coupled with, for example, a biometric app and a website, among other things. In alternative embodiments, the trust utility may be be built on any type of distributed ledger architecture.

In some implementations, server(s) 102, computing platform(s) 104, and/or external resources 122 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, computing platform(s) 104, and/or external resources 122 may be operatively linked via some other communication media.

A given computing platform 104 may include one or more processors configured to execute machine-readable instructions. The machine-readable instructions may be configured to enable an expert or user associated with the given computing platform 104 to interface with system 100 and/or external resources 122, and/or provide other functionality attributed herein to computing platform(s) 104. By way of non-limiting example, the given computing platform 104 may include one or more of a desktop computer, a laptop computer, a handheld computer, a tablet computing platform, a NetBook, a Smartphone, a gaming console, and/or other computing platforms.

External resources 122 may include sources of information, hosts, and/or providers of virtual environments outside of system 100, external entities participating with system 100, and/or other resources. In some implementations, some or all of the functionality attributed herein to external resources 100 may be provided by resources included in system 100.

Server(s) 102 may include electronic storage 124, one or more processors 126, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and or firmware components operating together to provide the functionality attributed herein to server(s) 102. For example, server(s) 102 maybe implemented by a cloud of computing platforms operating together as server(s) 102.

Electronic storage 124 may comprise non-transitory storage media that electronically stores information. The electronic storage media of electronic storage 124 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 124 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 124 may include one or more virtual storage resources (e.g., cloud storage, a virtual private network, and/or other virtual storage resources). Electronic storage 124 may store software algorithms, information determined by processor(s) 126, information received from server(s) 102, information received from computing platform(s) 104, and/or other information that enables server(s) 102 to function as described herein.

Processor(s) 126 may be configured to provide information processing capabilities in server(s) 102. As such, processor(s) 126 may include one or more of a digital processor, an analog processor, a digital circuit designed to process information, an analog circuit designed to process information, a state machine, and/or other mechanisms for electronically processing information. Although processor(s) 126 is shown in FIG. 1 as a single entity, this is for illustrative purposes only. In some implementations, processor(s) 126 may include a plurality of processing units. These processing units may be physically located within the same device, or processor(s) 126 may represent processing functionality of a plurality of devices operating in coordination. Processor(s) 126 may be configured to execute machine-readable instruction components 108, 110, 112, 114, and/or other machine-readable instruction components. Processor(s) 126 may be configured to execute machine-readable instruction components 108, 110, 112, 114, and/or other machine-readable instruction components by software; hardware; firmware; some combination of software, hardware, and/or firmware; and/or other mechanisms for configuring processing capabilities on processor(s) 126. As used herein, the term "machine-readable instruction component" may refer to any component or set of components that perform the functionality attributed to the machine-readable instruction component. This may include one or more physical processors during execution of processor readable instructions, the processor readable instructions, circuitry, hardware, storage media, or any other components.

It should be appreciated that although machine-readable instruction components 108, 110, 112, 114 are illustrated in FIG. 1 as being implemented within a single processing unit, in implementations in which processor(s) 126 includes multiple processing units, one or more of machine-readable instruction components 108, 110, 112, and/or 114 may be implemented remotely from the other machine-readable instruction components. The description of the functionality provided by the different machine-readable instruction components 108, 110, 112, and/or 114 described below is for illustrative purposes, and is not intended to be limiting, as any of machine-readable instruction components 108, 110, 112, and/or 114 may provide more or less functionality than is described. For example, one or more of machine-readable instruction components 108, 110, 112, and/or 114 may be eliminated, and some or all of its functionality may be provided by other ones of machine-readable instruction components 108, 110, 112, and/or 114. As another example, processor(s) 126 may be configured to execute one or more additional machine-readable instruction components that may perform some or all of the functionality attributed below to one of machine-readable instruction components 108, 110, 112, and/or 114.

Figure 5:
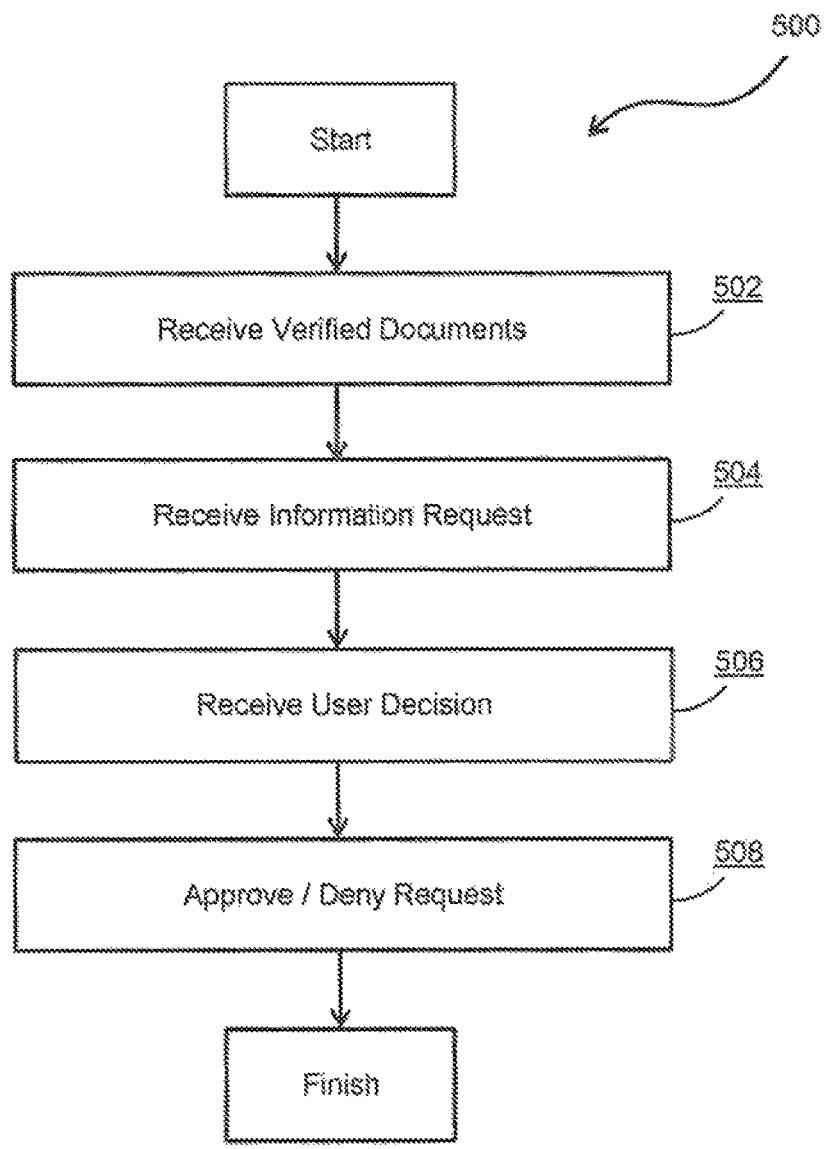
FIG. 5 illustrates a method for providing a universal decentralized solution for verification of users with cross-verification features, in, accordance with one or more implementations.

FIG. 5 illustrates a method 500 for providing a universal decentralized solution for verification of users with cross-verification features, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, one or more operations of method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, method 500 may include receiving information related to one or more verified first documents 206. As an example, the verified first documents may be received at a blockchain or trust utility from a first entity (e.g., first entity 204). The verified first documents 206 may be associated with a first user. Operation 502 may be performed by one or more physical processors configured to execute a machine-readable instruction component that is the same as or similar to receiving verified documents component 108 (as described in connection with FIG. 1), in accordance with one or more implementations.

At an operation 504, method 500 may include receiving a request for the information related to the verified documents (e.g., associated with the first user). As an example, the request may be received at the blockchain or trust utility from a second entity (e.g., second entity 206). Operation 504 may be performed by one or more physical processors configured to execute a machine-readable instruction component that is the same as or similar to receiving information request component 110 (as described in connection with FIG. 1), in accordance with one or more implementations.

At an operation 506, method 500 may include receiving a user decision (e.g., approval, denial, etc.). As an example, the user decision may be received at the blockchain or trust utility from the first user. The user decision may be with regard to the request for access to the verified documents associated with the first user or the information related to the associated verified documents. Operation 506 may be performed by one or more physical processors configured to execute a machine-readable instruction component that is the same as or similar to receiving user decision component 112 (as described in connection with FIG. 1), in accordance with one or more implementations.

At an operation 508, method 500 may include giving or denying access to second entity 208. If the request for the information is approved by the first user, access may be given by blockchain or trust utility 202 for second entity 208 to obtain access to the information. Likewise, if the request for the information is not approved by the first user, access may be denied by the blockchain or trust utility for second entity 208 to obtain access to the information. Operation 508 may be performed by one or more physical processors configured to execute a machine-readable instruction component that is the same as or similar to approval/denial component 114 (as described in connection with FIG. 1), in accordance with one or more implementations.

Exemplary implementations may facilitate storing personal data on the blockchain. The personal data may be stored on the blockchain in an encrypted way. A person may be identified at the blockchain level with one or more of a private key, a finger print, a finger print hash, an eye retina, an eye retina hash, and/or other unique information. The data stored may include or relate to one or more of a passport, an identification card, extracted passport information, a driver's license, extracted driver's license information, finger print, eye retina, and/or other information. According to some implementations, if some of the data is changed, a new record may be created for that person in the blockchain. That is, all changes are added as new records. The old record will always be stored on the blockchain. Generally speaking, all records on the blockchain are stored forever and cannot be removed. More than one copy of the blockchain will exist to ensure the records are not manipulated.

Exemplary implementations may facilitate access to personal data. There may be multiple access levels for the personal data in the blockchain trust utility. Access controls may be granted on public/private key pairs levels. Examples of access levels may include one or more of Super Admin (full access to the distributed ledger, database or blockchain). Authorities-country level (full read-only access). Authorities-state/local level (limited read-only access), Police and other services including Emergency (access to certain personal data by Finger Print/Eye retina of that person only), Participating Merchants (limited access), and/or other access levels.

Exemplary implementations may facilitate verification check. There may be multiple levels for how it is possible to check verification. For example, some implementations may ensure a person has a record at "Company" but no personal data is provided. Some implementation may ensure a person has a record at Company and get very basic personal information such as Full Name, DOB, Gender, and/or other basic information. Some implementations may ensure a person has a record at Company and get all personal data.

In some implementations, the technology may relate to using the PAS 1192-5 standard to manage construction information and keep information related to architecture and building construction and infrastructure security. PAS (Publicly Available Specification) 1192-5 is a standard published by the British Standards Organization for security-minded building information modeling (BIM) and smart asset management. These aspects may be related to relation to smart Cities, connected cities, connected houses, smart grids (e.g., energy, etc.), and/or the like. These aspects may relate to the underlying security for Internet of Things (IoT) for smart devices interconnecting but at a construction, architectural, and/or grid based level.

AS 1192-5:2015 is the specification for security-minded building information modelling, digital built environments and smart asset management.

PAS 1192-5 specifies the processes that may assist organizations in identifying and implementing appropriate and proportionate measures to reduce the risk of loss or disclosure of information that could impact on the safety and security of: personnel and other occupants or users of the built asset and its services; the built asset itself; asset information; and/or the benefits the built asset exists to deliver.

Such processes can also be applied to protect, against the loss, theft, and/or disclosure of valuable commercial information and intellectual property.

The PAS has been developed to integrate a security-minded approach into the construction lifecycle processes as specified in PAS 1192-2 and the asset management processes described in PAS 1192-3.

PAS may be specifically applied to the built asset, which may be a single building, a site or campus, and/or a portfolio or network of assets.

These aspects may be related to the mobile data that can be processed, collated, and/or held within the distributed ledger (whether in regards to the biometric identity of an individual and/or client).

In use, the system of the present invention, for example as depicted in FIG. 4, fulfills two primary functions; (1) the addition of data to the platform regarding entities to enable the cross-sharing of information among them, the information to include information about trusted entities, user ID information from various sources, and files of biometric ID data about users; and (2) the response to an inquiry or request from one entity to another to initiate cross-verification of data.

In one use case, for example, an administrative company adds Company A and to Company B to the platform (e.g., system 100) so that both companies can perform ID verifications and participate in the cross sharing of user data between companies. With regard to this use case, a company may include a bank, insurance company, financial industry, mobile industry, government industry, public industry, or any type of other entities that are considered trusted companies. In some cases, the trusted companies may include ATM (automated teller machine) companies and terminals. In some cases, a trust company may include a company or individual that is regulated by any form of a government entity.

In the foregoing use case, a company may add data of a user to its database. The user data may include the user's private data, for example the user's, identification card, driver's license, passport, utility bill, and or other documents that states proof of identification and address (e.g., AML-based (Anti-Money Laundering) or KYC-based (Know Your Customer) documents). The user data may additionally or alternatively include insurance documents, financial documents, medical records, or other document or personal data that belongs to the user. Such user data may further include the user's biometric data (e.g., recognition data for the user's face, retina/iris, fingerprint, heartbeat, vein, voice, etc.). The user or the trusted company can then create a user authorization code.

With respect to the foregoing use case, a company may obtain the user's biometric data or other private self-identifying data in a number of ways (e.g., in-person by a trusted company representative or government agency or in other manners). Biometric data may also be captured using a mobile application (e.g., via the hosting user device's camera or other sensor) or with an external biometric capturing device that can be attached to a user device's or other computing device. In some cases, a biometrics ATM may be used. In some cases, the biometric data may be confirmed without the user being present in the presence of a trusted party. As an example, a QR Code (e.g., linking to the biometric data) may be transmitted (e.g., via email, text messaging, etc.) to the user to confirm that the biometric data belongs to the user. Other means of ID verification may additionally or alternatively be used.

For instance, person to person registration verification (P2PRV) may be utilized to provide ID verification. P2PRV may include Person A verifying the documentation and registering Person B, where Person A has already been registered by a trusted company. Person A may verify Person B's documentation (e.g., by comparing Person B to his/her photo in Person B's documentation, asking Person B verification questions related to the documentation, etc.) and confirm that Person B is actually the one completing the biometric scan. Person A may enter the confirmation into the verification system.

In one use case, Company B (e.g., a secondary entity requesting user data of a user) may request from Company A (e.g., a primary entity that already has the user data) the entire user data or partial user data of the user that Company A has. Company A has the option of using a GPS locator security feature to validate the user identification information. As an example, the GPS locator security feature may be security feature that does not allow user data to be transferred to another Company unless an IP address or GPS locator matches the Company address listed on file (for that other Company). For example, Company A's computer system receiving Company B's request may check the IP address of the computer system from which the request was received to ensure that the checked IP address is on a list of authorized IP addresses in Company A's database (e.g., by verifying that the checked IP address is the same as an authorized IP address associated with Company B). As another example, Company A's computer system receiving Company B's request may check the IP address of the computer system from which the request was received to ensure that a location associated with the checked IP address is on a location at which Company A is located (e.g., by verifying that the checked IP address is associated with the same city or region as an address at which Company B is located). GPS tagging may additionally or alternatively be tied to each of the user data when being transferred.

With respect to the foregoing use case, a Company may perform a trusted company representative verification. As an example, Company A (which has the user data) may approve or decline the transfer of the user data, the user associated with the user data (e.g., the person that owns the passport or driver's license, biometric data, etc.) may be given a message in the form of an email, application notification via mobile application, text messaging, telephone call, or other form of communication to allow the user to approve or decline the request. The user may provide his user authorization code to Company B so that Company B can give that to Company A. The user authorization code may serve as an acceptance by the user to transfer over the user data to Company B. If the Company is a government agency, and there is no law requiring the government agency to seek approval from the user before the transfer from government agency to government agency, then the government agency will not have to seek user approval. If the user accepts the transfer of his private data from Company A to Company B, then an ID verification process must be engaged to confirm that the user indeed is the one that approved the transfer. For example, the user can either do a biometric scan on his or her mobile application to confirm he is who he says he is or simply send a text message. Company or users tagging can occur in order to ensure a higher level of security. After the user agrees to the transfer of the user data, then the transfer will be completed either partially or fully depending, on the user authorization code.

As noted in the Summary of the invention, an important objective is how, in real time and without human intervention, to verify user identification information among two or more entities that is related to the verified documents of a user. In one embodiment of the present system the nodes of a distributed database or ledger are linked together to create a trust utility for the cross-verification of user identification data to facilitate cross sharing transactions. The distributed ledger is modified with software analytics to include processing of sure user identification (ID) data associated with various kinds of user identification documents. Examples of such user ID documents include (a) private information—e.g., AML documents such as a user ID card, driver's license, passport, utility bill or other document stating proof of identity and address or contact information; (b) other private information—e.g., KYC documentation such as mortgage loans, insurance policies, bank statements, investment account statements, medical records, or other personal data such as resumes or curriculum vital documents; (c) biometric data including scans or images or hashes of finger prints, retina, iris or facial data, a voice print, photographs, behavioral characteristics, etc; and (d) person-to-person registration verification, i.e., P2PRV information. P2P registration verification occurs when one person verifies the documentation of another person. For example, person A is already a registered user and person A, upon request, verifies the identity of a person B.

Thus, a distributed database or ledger is formed among entities that have a need to exchange or share secure user ID information related to verified user documents, all of which must be kept secure during such sharing transactions. The "user" may include customers, clients, other entities, etc. Verified documents may include information about products, services, customer data, contracts, etc.

Broadly stated, the present invention comprises a cross verification (CV) trust utility that includes a system of computer-implemented nodes connected in a network and configured by programmed instructions stored in respective non-volatile or non-transitory memory to form a distributed database or ledger, which controls processes operational in each node for ensuring secure access, through mechanisms configured for establishing a secure verification address for a digital user identifier of a user related to verified documents of the user on the distributed ledger; validating the identity of a user's identification record associated with verified user documents stored in the distributed ledger of the system; and regulating access by an authorized entity to a user's verified documents on the distributed ledger. Alternatively, the present invention can be implemented on platforms unrelated to distributed ledgers, such as databases or other suitable platforms. The CV trust utility (See FIG. 7 to be described) may also be called an "administrative company" that enables two or more trusted companies to perform identification verifications and participate in the cross-sharing of user data between the trusted companies A trusted company (e.g., company A or company B) is a company or individual that is regulated by any form of government. Examples include without limitation banks, insurance companies, entities in the financial, telecom, and transportation industries, etc.

Figure 6:
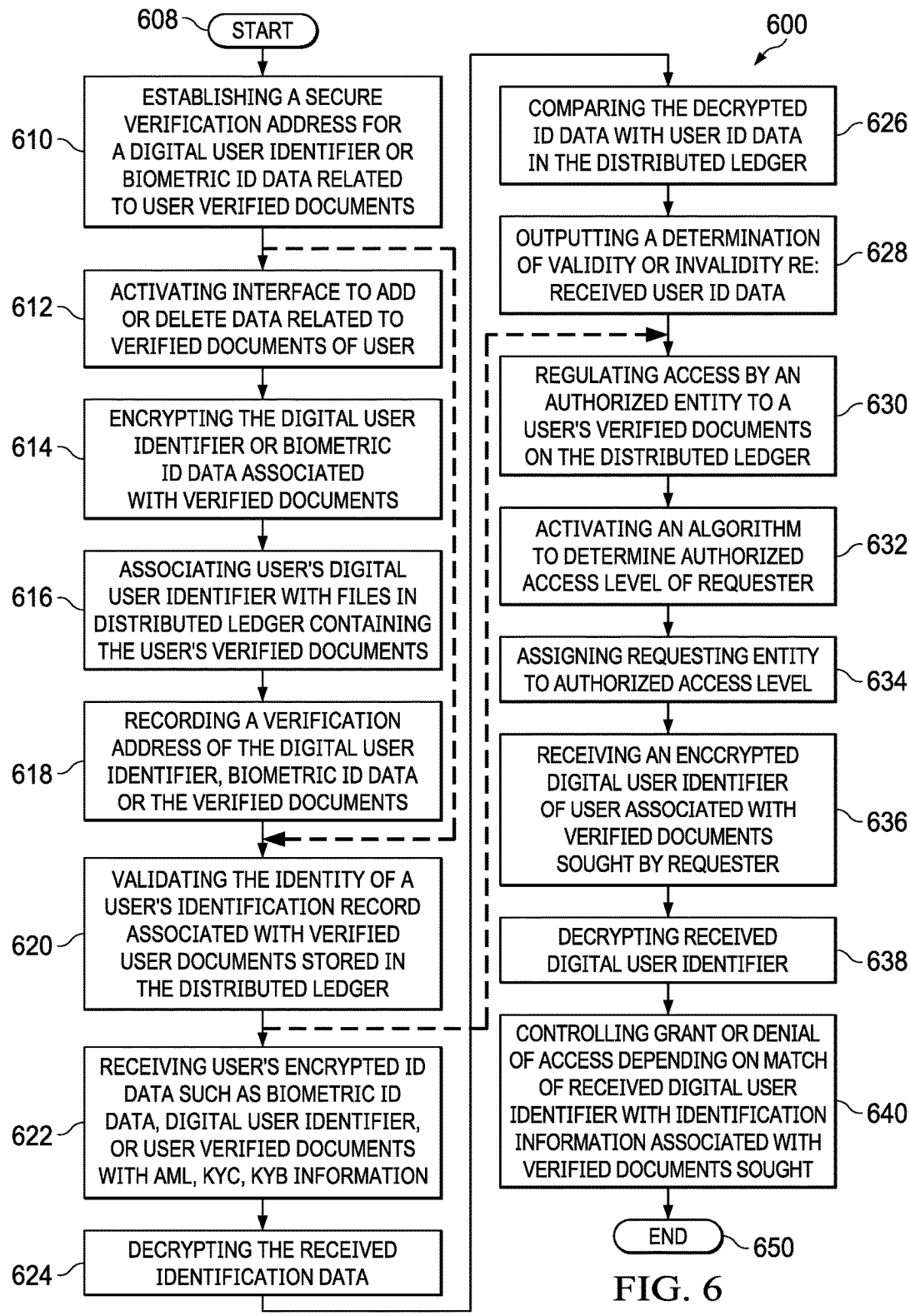
FIG. 6 illustrates a process operational in each node of a cross verification trust utility for ensuring a secure verification address for one of a digital user identifier or biometric identification data of a user.

In one embodiment illustrated in FIG. 6 (See steps 610 and 612-618) the process for establishing a secure verification address for a digital user identifier or biometric identification data of a user related to verified documents of a user on the distributed ledger comprises steps of (a) activating an interface configured to add or delete data related to verified documents or biometric identification data associated with the user (step 612); (b) encrypting the digital user identifier or biometric identification data associated with the verified documents of the user entered into the interface (step 614); (c) associating the user's digital user identifier with files in the distributed ledger containing the user's verified documents (step 616); and (d) recording the digital user identifier, the biometric identification data or the verified documents in the verification address (step 618). In one embodiment, the data associated with the verified documents of a user can be encrypted. The encryption of the data can be achieved by application of the AES algorithm, a PGP algorithm, the Blowfish algorithm, or another suitable encryption algorithm. In another embodiment, the data associated with the verified documents of a user can be hashed. The hashing of data can be achieved by application of an MD5 algorithm, SHA algorithm (e.g., SHA-0), SHA-2 algorithm (e.g., SHA-256) or other suitable hashing algorithm.

In another embodiment illustrated in FIG. 6 (See steps 620 and 622-628) the process for validating the identity of a user's identification record associated with verified user documents stored in the system, comprises steps of (a) receiving the user's encrypted identification data such biometric identification data, a digital user identifier, a user's location data set, or the verified user documents containing AML, KYC, or KYB information (step 622); (b) decrypting the received identification data (step 624); (c) comparing the decrypted identification data with user identification data stored in the distributed ledger system (626); and (d) outputting a determination of validation or invalidity regarding the received user's identification data (step 628).

In another embodiment illustrated in FIG. 6 (see steps 630 and 632-640), the process for regulating access by an authorized entity to a user's verified documents on a distributed ledger, comprises steps of (a) activating via the one or more processors in any node on the network an algorithm configured for determining an authorized access level of the entity requesting access (step 632); (b) assigning the entity requesting access to the determined authorized access level (step 634); (c) receiving an encrypted digital user identifier of the user associated with the verified document sought by the requesting entity (step 636); (d) decrypting the received digital user identifier(step 63); and (e) controlling the grant or denial of access depending on verification of a match of the received digital unique identifier with biometric identification data of the user associated with the verified document sought by the requesting entity (step 640).

Figure 7:
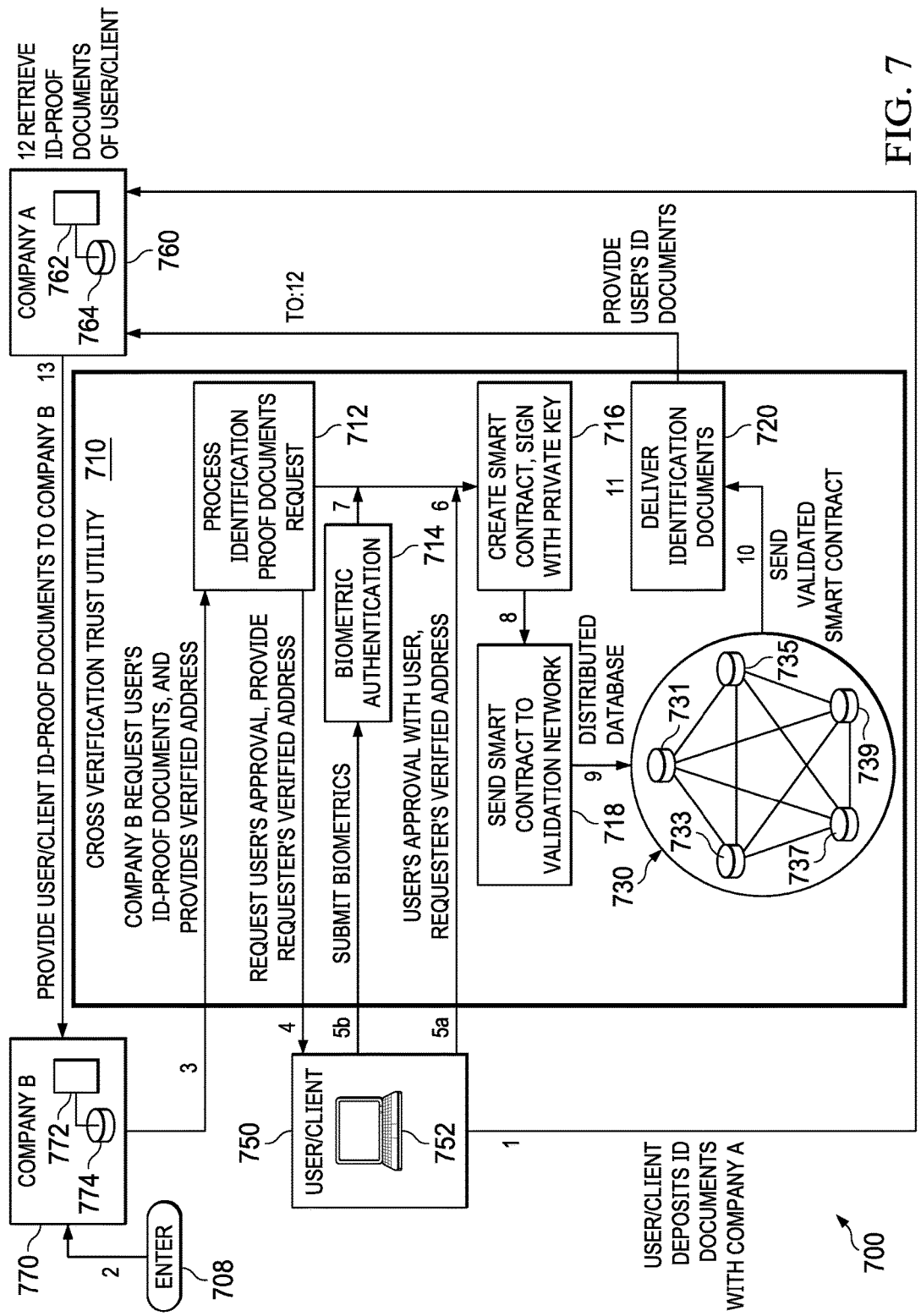
FIG. 7 illustrates a system for securing verified documents of a user held by a first entity and configured for responding to requests for access from a second entity upon authorization by the user.

FIG. 7 illustrates one embodiment of a structure of the system 700 of present invention that provides a Cross Verification Trust Utility 710 for performing the processes described and illustrated in FIG. 6. The Cross Verification Trust Utility 710~also called "CV 710" herein—may, for example, be embodied in an administrative trust utility providing the cross verification as a service. Briefly, in use an entity A, which has "verified ID-proof documents of a first user or client in its database, can respond to a request from an entity B for ID verification of the first user or by making available the ID proof documents of the first user to entity B if the first user (contacted by the entity B to agree to a smart contract regarding the approval for access by entity B to the ID record(s) held by entity A) approves the request for access. The system also accommodates the user's response to deny access as circumstances require it.

The cross verification trust utility CV 710 (which may also be called an "administrative company" 710 in some embodiments) may include one or more servers 712 through 720, each containing programmed instructions in non-transitory memory (not shown) for performing the depicted functions. The cross verification trust utility CV 710 preferably includes a distributed database network 730 formed by a distributed network of database elements 731, 733, 735, 737, and 739 in this example, each database element being connectable to each other database element in the distributed database network 730. A database is a collection of data organized to accommodate a variety of subject matter, arranged to enable convenient access and/or other processing functions. The distributed database network 730 (identically, a trust utility database 730) may be configured as a distributed ledger system as in a blockchain or as in an alternative that is not a blockchain per se but a distributed ledger or other data network that may function at least in part in the manner of a blockchain but which differs in significant ways. An example of the latter type of distributed ledger is the so called R3 Corda. Other examples may include Examples of a blockchain include the well-known Ethereum and HyperLedger Fabric.

FIG. 7 depicts the modifications to the trust utility CV 710 according to the present invention that provide the technological improvement, heretofore not previously available, to a computer-implemented system operated according to specific new programmed instructions that provides the novel advancement in the state of the art for cross verifying user or client identification information, particularly among on-line entities or on-line and physically-embodied entities having a physical address at a real estate location.

FIG. 7 also depicts other entities that typically interact with the cross verification trust utility CV 710 through links or connections that are assigned numeric identities in FIG. 7. These numeric identities represent paths or operations taking place in one example of a sequence for cross-verifying a user or client's digital unique identifier, user ID, biometric identification data, etc. These connections or linkages are labeled with the numerals 1 through 13 in FIG. 7.

In one example depicted in FIG. 7, a user or client 750, using a laptop computer configured for operation in the system 700 may, at some previous time have entered—i.e., registered—via path #1 his or her identification information and personal, private, or business documents along with affirmation of their authenticity (verification) into the records of an entity represented as "company A" 760 Thus company A 760 may be said to have "captured" the user's information. This information may be processed in a computer system 762 of company A and stored in a database 764 linked to computer system 762 in company A 760. At a subsequent time, the sequence to he described begins at the "Enter" symbol 708 via the path #2, for example when an entity "Company B" 770, perhaps contacted by the user or client 750, or engaged in furthering a business activity or transaction of or associated with user or client 750, desires to verify the identity of user or client 750, or information provided by user or client 750, to company B 770 by communicating with company A. The processes employed in the system 700 to accomplish this objective are described and illustrated in FIG. 6. The sequence for carrying out these processes may proceed as depicted in FIG. 7 and described as follows.

Company B 770 in path #3 forwards a request to CV 710 for obtaining ID-proof documents of user 750 along with providing a "requester verification address" from company B 770 to the CV 710 at server 712 to process the request. The request is then sent by server 712 along path #4 to the user 750, with the "requester verification address" of company B, for approving company B's request for the user's ID proof document. The user 750 can respond, in this example, in one of two ways, either by (a) submitting along path #5a the user's approval and the requester verification address" or by (b) submitting the biometric identification information along path #5b to a biometric authentication server 714 in the CV 710 for authenticating the user's identity.

In alternative (a) the submission reaches server 716 along path # 6 to create a smart contract that may be signed with the user's private key (stored in the user or client's computer system 752) corresponding to an approver verification address of the user or client 750. The contract may include an "approver address", which is the user's verification address; and a "requester address", which is company B's verification address. In alternative (b) the user submits his or her biometric identification data along path #5b to the server 714 to perform a biometric authentication. Whether the user 750 submitted his or her biometric identification information along path 5b to server 714, and the biometric authentication is affirmed (passes) along path #7, or a smart contract was created, signed with the user's private key, and sent along path #6 to server 716, the smart contract is then sent along path #8 to the server 718, to forward the created and signed smart contract via path #9 to the validation network in the CV 710.

The validation network in the CV 710 may preferably be a distributed database 730 formed by a plurality of database nodes connected to each other in the network. Whether the distributed database 730 is configured as a distributed ledger in a blockchain-based ledger or a non-blockchain-based ledger, the distributed ledger operates to validate the smart contract and record the smart contract, to thereby release the verified documents of the user or client 750 to company B, followed by sending along path #10 the validated smart contract within CV 710 at server 720 to process the delivering of the user's identification documents (denoted in FIG. 7 by the numeric #11. The delivery of the users or client's ID-proof documents proceeds along path #12 to company A 760 for storage therein, e.g., database 764. Subsequently the ID-proof documents of the user or client 750 may be provided by company A 760 to fulfill the request of company B 770 via path #13. This completes the exemplary process performed by the CV 710.

The distributed ledger can vary from a general distributed database as follows: (a) the control of the read write access is truly decentralized and not logically centralized as for other distributed databases, and as a result (b) there is an ability to secure transactions in competing environments, without trusted third parties. Distributed ledgers structures can be linear, such as blockchain, or incorporate Directed Acyclic Graphs (DAG), such as Iota Tangle, Blockchain, Iota Tangle, and Hedera Hashgraph, are specific instances of a distributed ledger, having respective predefined formats, algorithms, and access protocols.

Blockchain is a distributed ledger capable of chronologically storing cryptographic bitcoin electronic money (CBEM) transactions. In a blockchain ledger, all CBE-M_transactions are periodically verified and stored in a "block" that is linked to the preceding block via a cryptographic hash. The blockchain ledger is publicly viewable, allowing the general public to view and keep track of CBEM transactions. Each network node can receive and maintain a copy of the blockchain.

Cross verification requiring user or client approval frequently exists in private industry, where some type of identification verification must he used to confirm client approval. For example, other methods of verifying user identity than those described above may include without limitation a text message (SMS) code, biometric authentication, voice recognition, security questions, going on-line to utilize bank verification (as when requested by a third party to verify one's identification), or any other type of identity verification.

In an alternative embodiment or example of use, the present system may be used to facilitate the transfer of data without user or client approval when it is not required. This situation may arise when the request for ID verification originates from a government or a government agency to another government or agency, such as those cases when law or regulations do not permit the government or agency to request authorization from the user or client.

A modified security process may be required for transferring documents when one of the entities is an On-Line company to limit the information that might come into the hands of one who succeeds in hacking into the on-line company's system. One example to provide limited access may proceed in two stages as follows, when the on-line company needs to confirm a client's identity. The on-line company may request a message "Verified" or "Not Verified" from the trusted party that includes the client's name and a unique identification number. The unique identification number may, for example, be randomly generated at the time the client completes a registration process at the trusted party's office. Even, though the client may agree to transfer all of the information requested, the on-line company may obtain partial information in stages.

In stage one, the requesting on-line party may receive only the client's name, unique identification number, and a text message "Verified" or "Not Verified." In stage two, the requesting on-line party will request the remaining client information such as AML-type identification information and/or KYC information to confirm or authenticate the client's identity.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. In a system of computer-implemented nodes connected in a network and configured by programmed instructions stored in respective non-transitory memory units to form a distributed ledger, a cross-verification process for secure exchange of requests for and access to verified identity documents of a user, comprising the steps of:
   establishing a secure verification address of a first entity on the distributed ledger for a digital user identifier or biometric identification data of a first user to be associated with the verified identity documents of the first user to be stored at the first entity by performing the steps of:
      activating an interface configured to add or delete data related to the digital user identifier or biometric identification data associated with the first user;
      encrypting the digital user identifier, the biometric identification data or the first user's name associated with the verified identity documents of the first user using a private key and a public key;
      associating the encrypted digital user identifier with files in the distributed ledger containing the verified identity documents of the first user; and
      storing the verification address of the encrypted digital user identifier, the biometric identification data in association with the associated verified identity documents of the first user in each node of the distributed ledger; and
   receiving the verified identity documents of the first user at the verification address of the first entity on the distributed ledger, wherein the verified identity documents are selected from the group consisting of a passport, a driver's license, a social security number, a utility bill, a biometric identification file, a user location data set, an AML (anti-money laundering) file, a KYC (know your customer) file, and a KYB (know your business) file;
   receiving a request from a second user at a second entity on the distributed ledger for access to the verified identity documents of the first user at the verification address of the first entity;
   authenticating the identity of the second user to receive permission to obtain the requested access;
   regulating, in response to an authenticated request of the second user, the access to the verified identity documents of the first user at the verification address of the first entity on the distributed ledger;
   issuing a grant or denial to the second user to the request for access to the verified identity documents of the first user; and
   providing the requested verified identity documents or withholding access to the verified identity documents.

2. The process of claim 1, wherein the step of establishing a secure verification address further comprises the step of:
   assigning an access level related to the digital user identifier, the biometric identification data, or the first user's name for controlling access to the first user's verified identity documents or biometric identification data.

3. he process of claim 2, wherein the step of assigning an access level comprises the step of:
   selecting the access level from the group consisting of full access, full read-only access, limited read-only access, emergency services access, and limited access.

4. The process of claim 1, wherein the biometric identification data comprises: data selected from the group consisting of an image or hash of a finger print, an iris or retina, a voice print, a face, a data set of behavioral information, and a combination of the foregoing.

5. The process of claim 1, wherein the step of encrypting comprises the steps of:
   retaining the private key on a user device in one of a SIM card or a data file; and
   retaining the public key on a server in the system.

6. The process of claim 1, wherein the step of associating comprises the step of:
   validating in the distributed ledger the association between the first user's verification address of and the verification address of the second user at the second entity.

7. The method of claim 1, wherein the step of regulating access to the verified identity documents of the first user at a verification address of the first entity on the distributed ledger, comprises the steps of:
   activating via the one or more processors in any node on the network an algorithm configured for determining an authorized access level assigned to the entity requesting access;
   assigning the entity requesting access to the determined authorized access level;
   receiving an encrypted digital user identifier of the first user associated with the verified identity documents of the first user at the verification address sought by the requesting entity;
   decrypting the received digital user identifier of the first user; and controlling the grant or denial of access to the requesting entity for the verified identity documents of the first user depending on verification of a match of the received digital user identifier with, the digital user identifier or biometric identification data of the first user associated with the verified identity documents sought by the requesting entity.

8. The process of claim 7, wherein the step of receiving comprises the steps of:
   entering the received encrypted digital user identifier into a temporary storage location; and
   confirming the received digital user identifier is encrypted with a public/private key system.

9. The process of claim 7, wherein the step of decrypting comprises the steps of:
   applying the public key and the private key information to contents of the temporary storage location; and
   replacing the contents of the temporary storage location with the decrypted digital user identifier.

10. The process of claim 7, wherein the step of controlling the grant or denial of access comprises the steps of:
    reading the digital user identifier after decrypting; and
    granting access to the verified identity document if the identity of the requesting entity is verified; or
    denying access to the verified identity document if the identity of the requesting entity is not verified.

11. The process of claim 1, wherein:
    the cross-verification process for secure access to verified identity documents of a user is a precondition to a transaction.

* * * * *